Patented Nov. 18, 1924.

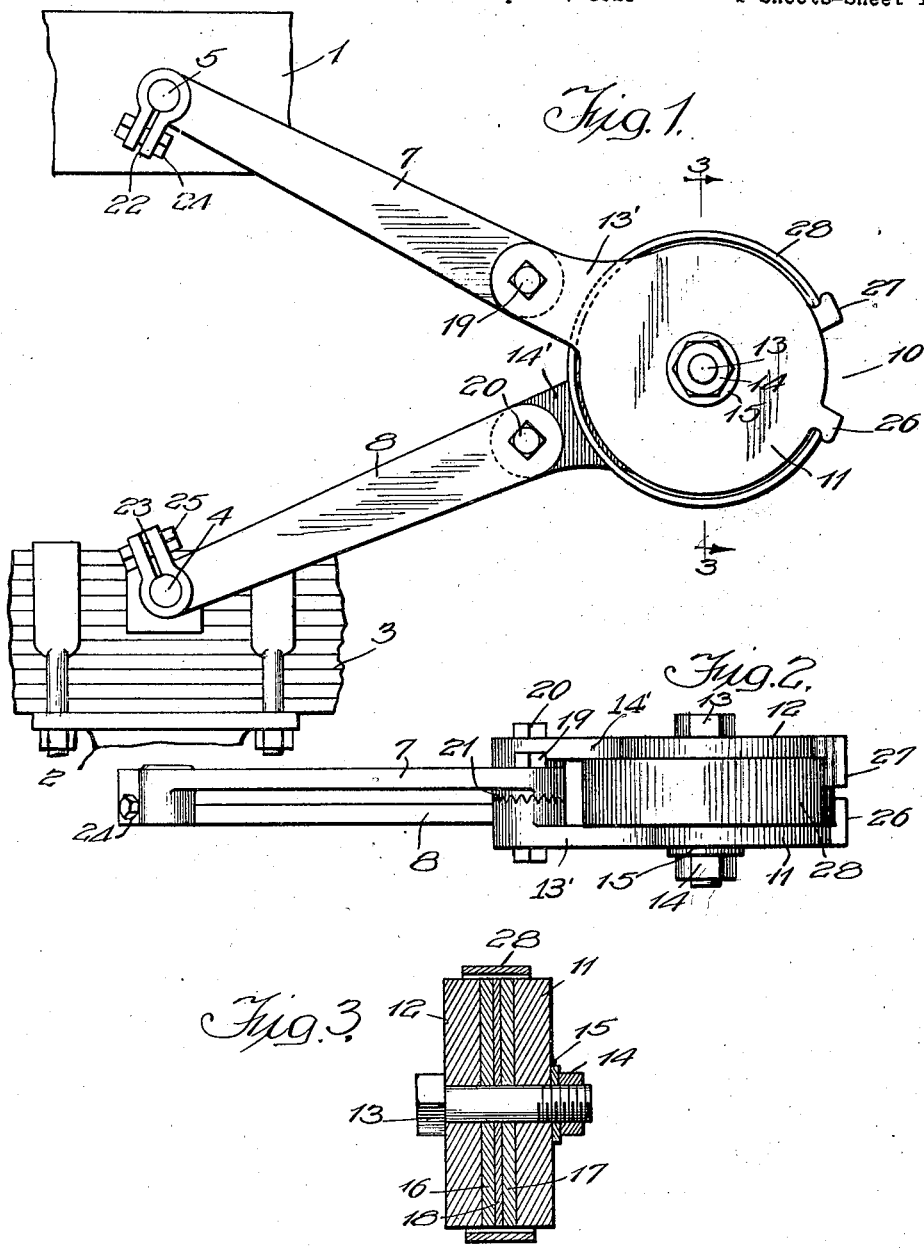

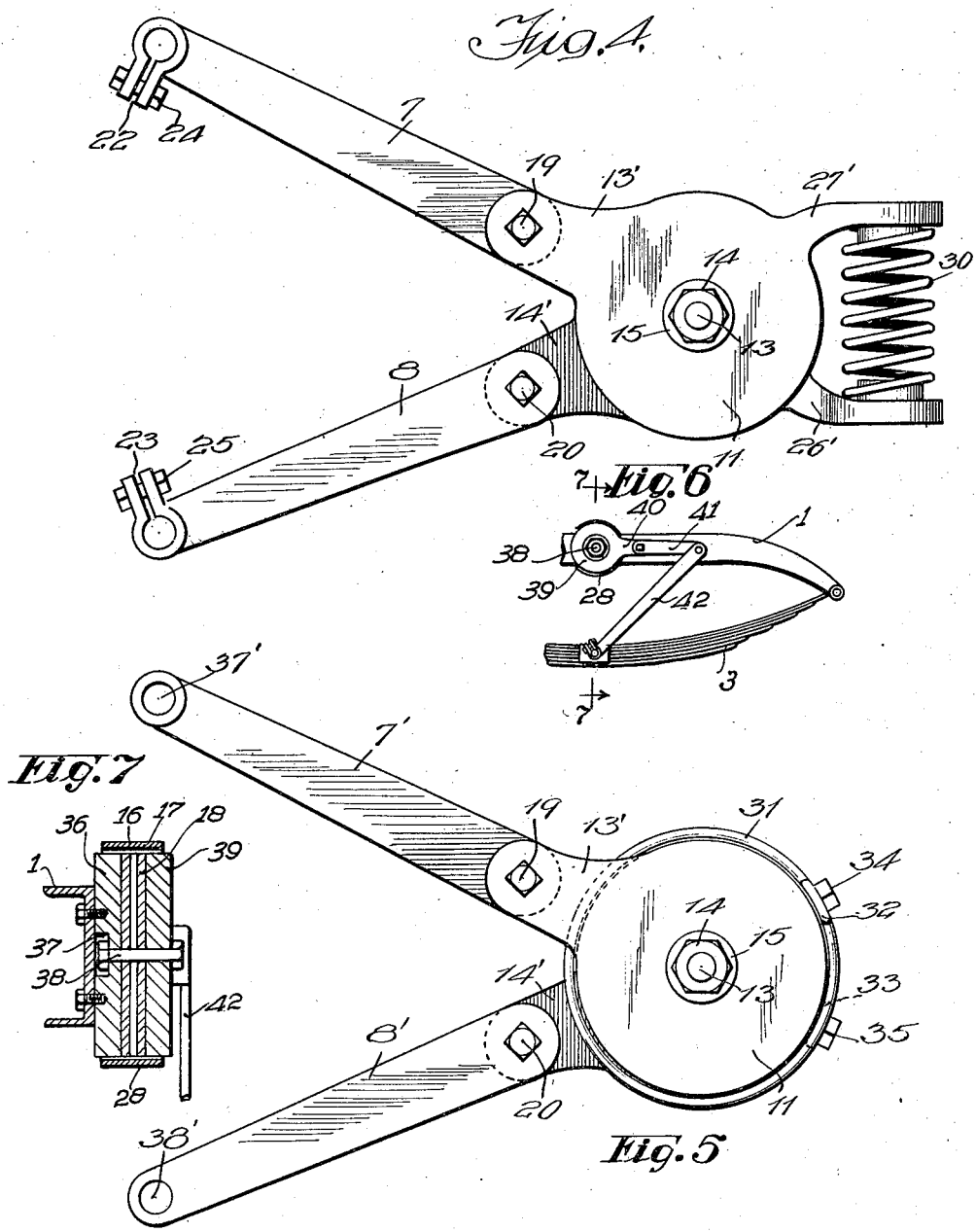

1,516,185

UNITED STATES PATENT OFFICE.

WARD E. GUEST, OF CHICAGO, ILLINOIS, ASSIGNOR, BY MESNE ASSIGNMENTS, TO WILLIAM E. DEE COMPANY, OF CHICAGO, ILLINOIS, A CORPORATION OF ILLINOIS.

RECOIL ABSORBER.

Application filed September 6, 1921. Serial No. 498,784.

*To all whom it may concern:*

Be it known that I, WARD E. GUEST, a citizen of the United States, residing at Chicago, in the county of Cook and State of Illinois, have invented a certain new and useful Improvement in Recoil Absorbers, of which the following is a full, clear, concise, and exact description, reference being had to the accompanying drawings, forming a part of this specification.

My invention relates to vehicles and more particularly to means for controlling the spring action of vehicles usually termed recoil checks or recoil absorbers.

It is well known to those familiar with vehicle construction, particularly automobile construction, that the spring suspension of a motor vehicle is called upon to meet a very wide range of conditions and yet it must be satisfactory to the individual requirements of each owner. It has become the practice to modify the action of the main spring suspension in two ways, first by interposing additional spring mechanism between the frame and the axle in series with the main spring suspension which will soften the effect of the main spring suspension, and second by providing frictional means for assisting the spring in absorbing the downward thrust of the vehicle body due to irregularities of the road or to absorb the energy of recoil of the spring after the spring is once deflected.

My invention belongs to the latter class although the principle of the invention is not to be limited to such use.

According to my invention I provide a pair of friction members which are relatively movable with respect to each other but offer a certain frictional resistance to movement. These members are connected respectively to the frame and to the axle or other parts of the suspension between which the main spring suspension is connected so that relative movement of the frame and axle or other parts requires a movement of these friction members which resist such motion. It is desirable to permit the frame and spring to move towards each other to permit the spring to absorb shocks caused by the vehicle passing over projections in the road but since the energy of such deflection is transmitted through the spring subtsantially without loss to the frame and results in a rebound of the frame which is highly undesirable, it is desirable that the modifier of the spring action absorb the energy of the spring during this stage of the movement. In other words, it is desirable to permit the spring to be deflected by relative upward movement of the axle, but it is also desirable to prevent the spring from thereafter throwing the frame or body violently upward. I provide spring means operating in a direction to oppose the effect of the main spring, this spring being attached to the two friction members and being of a slightly less value than the friction between these members so that every movement of the frame toward the axle is hindered but slightly while relative movement of the frame away from the axle encounters not only the resistance of the friction members but also the resistance of this additional spring.

Another important function of this spring is to keep the friction device constantly under the friction tension to make it relatively "live" and yet take up all of the slack in the parts to prevent wearing and rattling.

In addition my invention provides adjustable means in the connections between the friction members and frame and axle, respectively so as to permit adjustment of the effect of the auxiliary spring. In order to acquaint those skilled in the art with the manner of constructing and employing my invention I shall describe in conjunction with the accompanying drawings a particular embodiment of the same and the manner of its use.

In the drawings:

Figure 1 is a side elevational view of the preferred form of my invention attached to the frame and spring of a vehicle.

Figure 2 is a top plan view of the same;

Figure 3 is a section taken on line 3—3 of Figure 1;

Figure 4 is a side elevational view of a modification;

Figure 5 is a similar view of a further modification;

Figure 6 is an alternative embodiment of my invention; and

Figure 7 is a section taken on line 7—7 of Figure 6.

The frame 1 of the vehicle and the axle 2 of the vehicle are normally connected by a main spring suspension 3 shown only in a fragmentary manner, since these parts are well understood by those skilled in the art. The axle member 2 has connected thereto a pin 4 and the frame has connected thereto a similar pin 5 to which pins are connected the arms 7 and 8 of the recoil check or recoil absorber 10 of my invention. These arms 7 and 8 are connected to a pair of discs 11 and 12 which are clamped together by means of a bolt 13 having a suitable nut 14 and spring washer 15. A plurality of friction members in the form of discs 16—17 preferably of hard fiber, separated by a disc or discs 18 of relatively soft fiber, lie between the plates 11 and 12. The plates 11 and 12 have short radial arms 13′ and 14′ connected thereto, these arms being provided with serrated faces to engage with co-operating serrated faces on the ends of the arms 7 and 8 as indicated at 21 in Fig. 2. The arms 7 and 13′ as well as the arms 8 and 14′ are held together by these serrated faces in any desired position of adjustment through the medium of the clamping bolts 19 and 20.

The opposite ends of the arms 7 and 8 are split as shown at 22 and 23, and then provided with clamping bolts 24 and 25 in order that the wear at this point may be taken up.

Plates or discs 11 and 12 are provided with projecting arms 26 and 27 which arms engage the ends of a spring 28, this spring being disposed peripherally about the edges of the plates 11 and 12. The spring 28 tends to push the projections 26 and 27 towards each other to assist in a downward motion of the frame with respect to the axle, and to resist relative upward movement of the same.

The operation of the device is as follows. The discs 11 and 12 are clamped together with the friction discs between them to provide a predetermined amount of friction to movement of the members 11 and 12 in either direction. The spring 28 is put under sufficient tension almost to equal the friction between the discs in one direction and to add to said friction in the other direction. Thus for example, assume that the friction between the discs 11 and 12 would normally present 50 pounds of resistance at the points 4 and 5 to movement of these parts in either direction, that is either towards each other, or away from each other. Also assume that the spring 28 is put under proper tension to require a force of substantially 40 pounds to overcome the same, and as previously explained spring 28 is now disposed so as to tend to collapse the arms 7 and 8 towards each other and to resist motion of separation between them. The result of this construction is that when a bump is encountered in the roadway the axle 2 and spring 3 are forced upwardly towards the frame 1, the spring 3 tending to take up such irregularity and thereby storing energy. At the same time only the difference between the spring strength and the friction to be overcome is required to permit these parts to move towards each other, namely the axle towards the frame or the frame toward the axle. Thereafter the energy stored in the spring begins to move the frame upwardly, but such motion is resisted by the additive force of the spring and the friction.

I have conducted numerous tests of a device constructed according to this principle and I find that it very materially snubs or checks the recoil and makes riding of the vehicle notably easier.

In Figure 4 I have illustrated a modified embodiment of the invention in which the radial arms 26′ and 27′ are extended outwardly so as to embrace a coiled or helical spring 30 between them. Otherwise the device is constructed as indicated in Fig. 1. Its operation is similar to the operation described in connection with Figure 1 but the arrangement of the spring 30 with respect to the friction discs is not as advantageous.

In Figure 5 I have illustrated a further modification in which a spring 31 is coiled one or more times about the central part of the device between the radial arms 13′ and 14′ and is provided with loops 32—33 at its ends which loops are secured to the members 11 and 12, respectively by the cap screws 34 and 35. In this manner a relatively heavy spring can be mounted upon the device in a simple, convenient manner, the cap screws 34 and 35 taking the place of the projections 26—27.

By referring to Figures 6 and 7, it will be noted that I contemplate mounting the absorber, embodying my invention, in an alternative manner, so that, while the relation of the absorber and main spring and vehicle frame may be different, yet the action of the device will be the same. In this form, the absorber is mounted on the vehicle frame so that one of the circular plates, designed to be secured to the frame, is held stationary, and, the other permitted to be movable in cooperating relation with the main spring 3. To the frame 1, in any suitable manner, is attached a circular plate 36 formed with a recess 37. A bolt 38 passing through this plate carries a disc 39 between which are carried the usually friction members 16, 17 and 18. The spring 28 is mounted in a manner similar to that shown in Figure 1, functioning substantially the same way.

The arm 40 provided on the disc 39 connects with a longer arm 41 through means of an adjustable serrated joint. The arm 40 preferably extends in substantially a horizontal direction, and pivotally connects with a lever 42. The lower end of this lever 42 may be attached to the spring 3 in any manner desirable.

The arms 7' and 8' in Fig. 5 are provided with plain bearings as shown at 37' and 38', but, obviously, this may be modified if desired.

I do not intend to be limited to the precise details shown and described as the above principle may be applied in a great variety of forms.

What I claim is:

1. In combination, a pair of relatively movable plates, friction means for restraining the movement of said plates, said friction means lying between and separating said plates from a face to face contact, and a spring tending to move said plates relative to each other against the resistance of said friction means in one direction, said spring being concentrically mounted about the outer periphery of said plates.

2. In a recoil absorber, a pair of substantially circular plates having relative movement about a common axis, friction means for restraining said movement, said friction means separating said plates from a face to face contact, arms projecting from said plates, a spring of less resistance than said friction means tending normally to bring said arms together, said spring being substantially of a single convolution and lying about the periphery of said plates.

3. In combination with a frame member and a resilient suspension for said frame member, of a pair of plates, friction means between said plates, means for clamping said plates together to predetermine the resistance offered by said friction means to relative movement between said plates, one of said plates supported in rigid relation to said frame, the other plate being in pivotal relation to said resilient suspension, a spring in circumferential relation to said plate for easing the movement of the plate in one direction and for opposing motion in the opposite direction, and means in the connection between said pivotally related plate and said resilient suspension for permitting adjustment on said spring.

In witness whereof, I hereunto subscribe my name this 30th day of August, 1921.

WARD E. GUEST.